BLOCK DIAGRAM OF THE FREQUENCY MULTIPLIER

TRANSFER FUNCTION DIAGRAM OF FREQUENCY MULTIPLIER

INVENTOR
RAYMOND B. SEPE
BY Robert Bruce Brodie
ATTORNEY

FREQUENCY MULTIPLIER AND FREQUENCY WAVEFORM GENERATOR

Filed May 16, 1968 5 Sheets-Sheet 2

LOGIC CIRCUIT DIAGRAM OF n-BIT PROGRAMMABLE DIVIDER

INVENTOR
RAYMOND B. SEPE

BY Robert Bruce Brodie
ATTORNEY

INVENTOR
RAYMOND B. SEPE
BY Robert Bruce Brodie
ATTORNEY

LOGIC CIRCUIT DIAGRAM OF m-BIDIRECTIONAL COUNTER

INVENTOR
RAYMOND B. SEPE
BY Robert Bruce Brodie
ATTORNEY

FREQUENCY MULTIPLIER AS AN UP-DOWN RAMP GENERATOR

WAVEFORM GENERATOR

FREQUENCY WAVEFORM VIBRATIONS

INVENTOR
RAYMOND B. SEPE
BY Robert Bruce Brodie
ATTORNEY

United States Patent Office 3,551,826
Patented Dec. 29, 1970

3,551,826
FREQUENCY MULTIPLIER AND FREQUENCY WAVEFORM GENERATOR

Raymond B. Sepe, Johnston, R.I., assignor to Raytheon Company, Lexington, Mass., a corporation of Delaware Filed May 16, 1968, Ser. No. 729,701
Int. Cl. G06g 7/16; H03k 29/00
U.S. Cl. 328—160 10 Claims

ABSTRACT OF THE DISCLOSURE

A frequency multiplier is shown in which a frequency divider is coupled in a feedback loop. The divider is responsive to an external input magnitude signal A for dividing an oscillator generator output frequency $w_2$ by A. A frequency difference signal is obtained by comparing the frequency divided signal $$\frac{w_2}{A}$$

with a reference frequency $w_1$. This difference frequency is used to vary the oscillator frequency $w_2$ such that $$w_2=k\left(w_1-\frac{w_2}{A}\right)$$

$k$ being a proportionality constant and $|k|>1$. The frequency divider may further be made digitally responsive.

Frequency waveforms are generated as the external input signal $A(t)$ is made a function of time. Also, a fractional multiplier is formed when the output of a frequency multiplier having an output frequency $w_1A(t)$ is applied to a frequency divider. If the frequency divider is also responsive to an externally applied time varying input signal $B(t)$, then the divider output frequency signal is $$\frac{A(t)w_1}{B(t)}$$

BACKGROUND OF THE INVENTION

This invention relates to a frequency multiplier and frequency waveform generator, and more particularly, to digitally responsive and controllable frequency multipliers and waveform generators.

In the prior art, it is known that a single frequency sinusoid signal can generate a multiple frequency output through the use of a nonlinear circuit element. Thus, a reference signal of 1,000 cycles per second can generate an output having components at 1,000, 2,000, 3,000 cycles per second, etc. If an output circuit is designed to pass only one of the harmonic terms, then it is clear that frequency multiplication is produced. In this regard, reference is made to "Electronic Circuits" by T. L. Martin, Jr., published by Prentice-Hall, Inc. New York, 1955 at pages 405 and 465. Such arrangements suffer the disadvantage of inaccuracy and distortion due to alterations of the non-linear element because of age or thermal effects. Open loop implementation of even a stabilized frequency source still means that the highest frequency multiples attainable are limited to the frequency of the frequency source. This tends to require a very high frequency reference or source signal.

It is generally known that a closed loop offers stability and further it offers several points into which a controlled signal may prospectively be inserted. Thus, the use of a phase lock loop in which a reference frequency may be synchronized with an incoming signal frequency is known. This is shown in the Bell Laboratories Record, July/August 1966 at pp. 236–268. Applying this principle to the problem of frequency multiplication, the problem arises as to where in the loop can control be inserted, and what is the nature of the most advantageous form of control.

Clearly, the use of frequency multiplication requires linearity between the multiplier control signal input and the frequency multiplier output. Likewise, a multiplier should advantageously accept a broad dynamic range of multiplier inputs in which the magnitude of successive inputs are, if necessary, independent of one another.

It is accordingly an object of this invention to devise a frequency multiplier bearing a linear relation between a control input and a frequency multiplier output.

It is yet another object of this invention to devise a frequency multiplier using closed loop control and further selecting the most advantageous portion of the loop for insertion of the control signal. Relatedly, it is an additional object to devise a multiplier capable of accepting a broad dynamic input signal range.

There are many uses for frequency waveforms varying as a function of time. Examples may be found in the frequency steering of antenna arrays, the frequency scanning of radar receivers, as well as, the alteration of the repetition frequencies of radar transmitters. Such uses are illustrated in "Introduction to Radar Systems" by Skolnik, published by McGraw-Hill, New York in 1962, Library of Congress Catalog Card No. 61-17675, particularly pp. 311–314 and 493–498.

It is accordingly another object of this invention to devise a frequency waveform generator utilizing a frequency multiplier.

SUMMARY OF THE INVENTION

The foregoing objects of this invention are satisfied in a preferred embodiment comprising a source of reference signals of frequency $w_1$; an analog magnitude responsive oscillator of frequency $w_2$; means responsive to a magnitude signal A and frequency signal $w_2$ for frequency dividing $w_2$ by A; means for algebraically combining the $w_1$ frequency and $$\frac{w_2}{A}$$

and means for applying an analog magnitude to the oscillator proportional to the algebraically combined frequency.

Restated, a closed loop is formed in which a reference frequency $w_1$ is multiplied by a magnitude A to form the output frequency $w_2$. The linear relation $w_2=Aw_1$ is attained through the use of a feedback loop in which is placed a frequency divider that in effect divides the output frequency $w_2$ that is fed back by A. A comparator algebraically combines the reference frequency $w_1$ and the divided down feedback frequency $$\frac{w_2}{A}$$

to form a control signal which varies an output frequency oscillator. Symbolically, the output frequency $w_2$ is equal to $$k\left(w_1-\frac{w_2}{A}\right)$$

where $k$ is the lumped transfer constant of the system. $w_2$ is equal to $Aw_1$ where $|k|\gg|1|$.

As is now apparent, a linear relation between a multiplier control input and multiplier frequency output is achieved. Furthermore, the stability to avoid the age and drift limitations of open loop multipliers is achieved through the closed loop formulation and the divider. Additionally, a dynamic input range may be achieved through the expedient of using a digitally responsive frequency divider in the feedback loop.

Dynamic range and the ability to insert successive magnitudes without regard to the previous magnitude is enhanced through the use of a digitalized frequency divider. One embodiment employs in addition a bidirectional counting means; means for causing the counting means to count in the first direction proportional to the reference frequency $w_1$ and for counting in a second direction proportional to the divided frequency $$\frac{w_2}{A}$$

The oscillator generating the output frequency $w_2$ is varied proportionally in response to the counter magnitude.

The frequency multiplier may be used as a frequency waveform generator when combined with an external bidirectional counter whose input magnitudes $A(t)$ may be varied as a function of time. If the frequency multiplier is placed in series with a frequency divider, each responsive to independent time varying signals, then a fractional multiplier may be constructed.

DESCRIPTION OF THE PREFERRED EMBODIMENTS

Figures 1A, 1B:
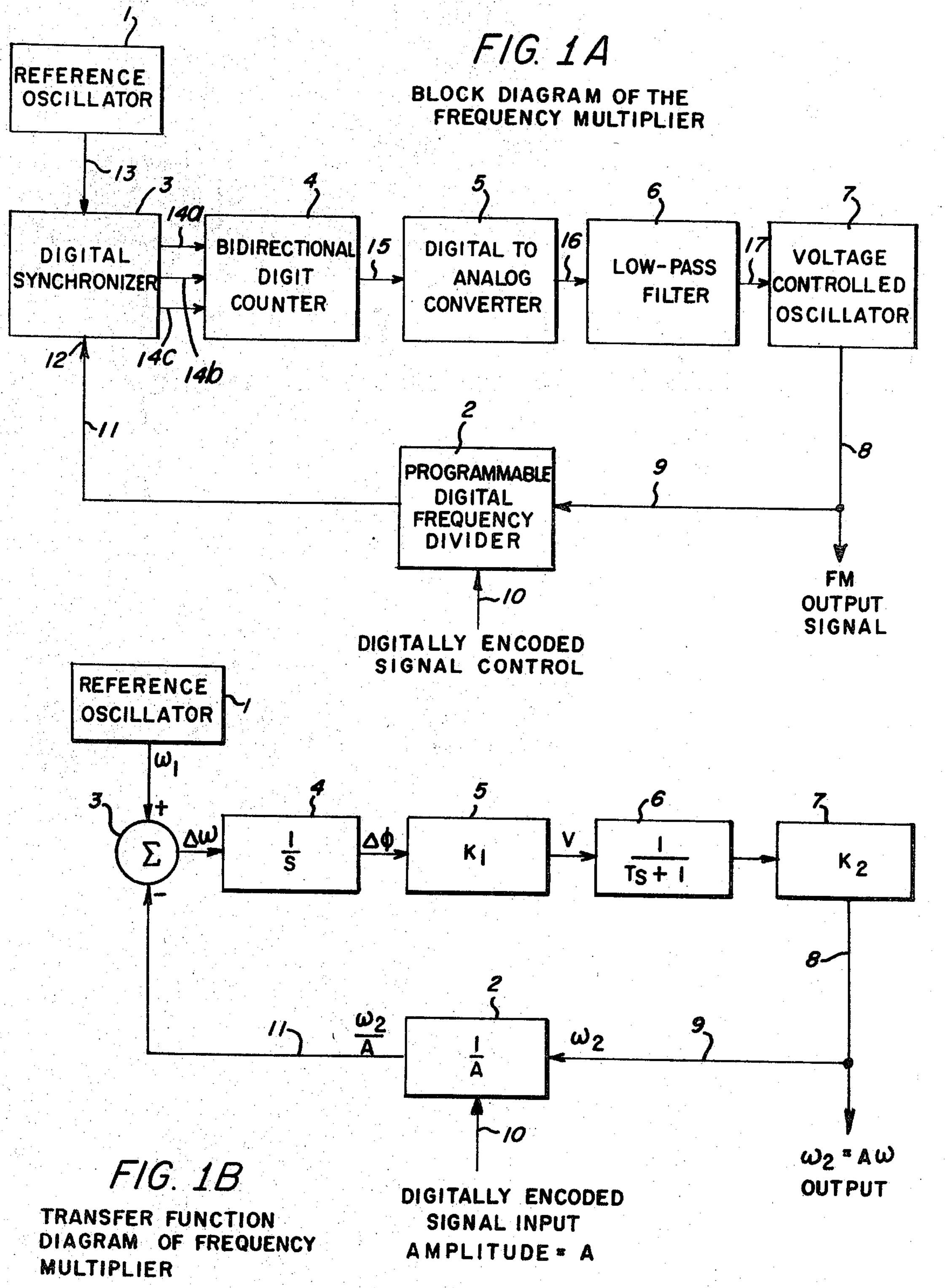
FIG. 1A is a block diagram of the frequency multiplier.
FIG. 1B is a transfer function diagram of the frequency multiplier.

In FIG. 1A, a block diagram of the frequency multiplier using a frequency divider in a feedback loop is set forth. Reference oscillator 1 provides a source of frequency signals at frequency $w_1$. Voltage controlled oscillator 7 provides another source of signals at frequency $w_2$. A frequency divider 2 is coupled in a feedback path to the output of the voltage controlled oscillator 7 at node 8 over path 9. The divider is responsive to an external input signal of magnitude A for dividing the output frequency $w_2$ and applying it to digital synchronizer 3 over path 11. The digital synchronizer 3 algebraically combines the frequency $w_1$ from oscillator 1 with the divided frequency $$\frac{w_2}{A}$$

from divider 2 in order to drive a bidirectional digital counter 4 in a first or second counting direction. This effectively forms a difference or error signal. The magnitude of the counter 4 is used to drive digital-to-analog converter 5 over path 15. This, in turn, is fed through low pass filter 6 over path 16 and applied to the VCO over path 17.

The detailed construction and operation of frequency divider 2, digital synchronizer 3, and bidirectional digital counter 4 will be described in detail in connection with the description of FIGS. 2–4. The nature of the operation of the closed loop system may be more completely appreciated by first considering some of the general closed loop properties. A discussion of the transfer function diagram 1B will then be made with reference to the stability requirements of such a system.

It may be recalled that a system having an open loop frequency transfer function of $K(w)$ and a feedback loop frequency transfer function $H(w)$ has a relative gain of the output signal $$\frac{\theta_0}{\theta_i}$$

of the form $$\frac{K(w)}{1+K(w)H(w)}$$

Attention is now directed to the transfer function diagram in FIG. 1B of the frequency multiplier block diagram of FIG. 1A.

Frequency divider 2 used in the feedback loop converts output frequency $w_2$ to a submultiple of the output frequency and therefore possesses a transfer function of $$\frac{1}{A}$$

where A is the instantaneous amplitude of the encoded input signal. Synchronizer 3 is a summation point representing the algebraic combination of the feedback frequency $$\frac{w_2}{A}$$

and the reference frequency $w_1$. The integration of phase error increments (the details of which will be described in connection with counter 4) is accomplished in the bidirectional counter and is represented by the well known LaPlace transformation term $$\frac{1}{s}$$

The gain of the digital-to-analog converter 5 may be represented by a constant $K_1$. The LaPlace transform of the low pass filter 6 is well known and is of the form $$\frac{1}{sT+1}$$

The VCO 7 accomplishes the voltage to frequency conversion and its analog representation is a constant $K_2$.

Now, $w_2$ is equal to the product of the transfer functions of digital counter 4, converter 5, filter 6, and VCO 7 which modify the difference frequency $$\left(w_1-\frac{w_2}{A}\right)$$

This is derived from synchronizer 3 and applied to counter 4. Thus, $$w_2=\frac{\left(w_1-\frac{w_2}{A}\right)K_1K_2}{s(sT+1)}$$

This reduces to $$\frac{w_2}{w_1}=\frac{K_1K_2}{s(sT+1)}+\frac{K_1K_2}{A}$$

The transient response is governed by the LaPlace frequency transform poles lying along the negative real axis of the root locus plot. In the instant case there are two poles distributed along the negative real axis with the locus running therebetween. Such a pole distribution indicates that the closed loop system is stable at both transient and steady state conditions and is in this respect insensitive to gain.

Let us now divide the numerator and denominator by the gain term $K_1K_2$, then $$\frac{w_2}{w_1}=\frac{\frac{1}{s(sT+1)}}{K_1K_2}+\frac{1}{A}$$

Now if the $$|K_1K_2|>|s(sT+1)|$$

then $$\frac{w_2}{w_1}=A$$

This conclusion can be arrived from a simpler mathematical argument. Assume the system represents a steady state operation and that the forward loop gain or transfer function is a constant K.

It follows then that $$w_2=\left(w_1-\frac{w_2}{A}\right)K$$

This yields $$\frac{w_2}{w_1}=\frac{K}{1+\frac{K}{A}}$$

If $|K|\gg1$, then $$\frac{w_2}{w_1}=A$$

Returning to FIG. 1A, it is seen that the programmable frequency divider 2 in the feedback loop serves as the point 10 for signal input. The divisor (multiplier for the closed loop system) is controlled or varied by the magnitude of the input signal. Essentially, divider 2 samples the output frequency $w_2$ and, through varying frequency division, provides a correction signal (in the feedback or control loop sense of the term) for use as a comparison frequency in digital synchronizer 3. Synchronizer 3 operates as phase discriminator. A highly accurate and stable crystal control oscillator used in reference oscillator 1 can be used to provide the synchronizer or phase discriminator with a reference frequency $w_1$. Algebraic combination of the reference frequency $w_1$ and the feedback frequency $$\frac{w_2}{A}$$

is accomplished in the digital synchronizer 3, which serves as a frequency summing point. Phase error increments from the synchronizer are integrated in the bidirectional digital counter 4. As the digital counter tracks the phase error between the reference frequency $w_1$ and the feedback frequency $$\frac{w_2}{A}$$

the contents of the counter is sensed by digital-to-analog converter 5, thereby generating a DC voltage proportional to phase error. This voltage is, in turn, fed through a filter 6 to the control input of the VCO to produce a change in the system output frequency $w_2$.

Since the preferred embodiment utilizes a digitally responsive frequency divider and further employs digital techniques in the synchronizer, and bidirectional counter, the detailed description and operation of these devices should illuminate understanding of the invention.

Figure 2:
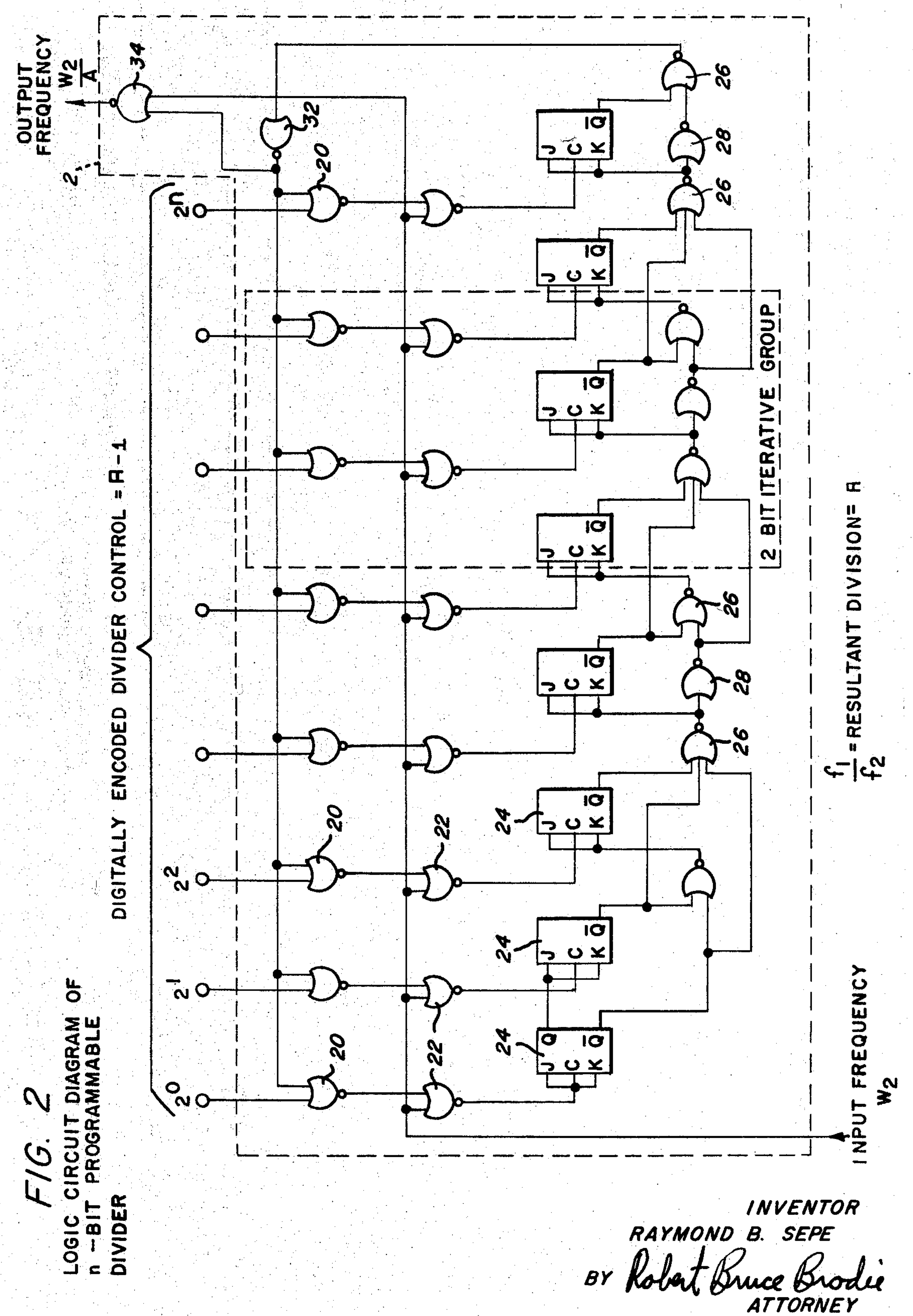
FIG. 2 is a logic circuit diagram of an $n$ bit programmable frequency divider shown in FIG. 1A.

FIG. 2 is a logic circuit diagram of the *n* bit programmable frequency divider. In operation, an input frequency $w_2$ may be divided by any integer A ranging from 1 to $2^n$, where *n* is the number of flip flops cascaded in the divider. The digitally encoded divisor is applied to corresponding input leads designated $2^0$ to $2^n$. These signals serve as corresponding inputs to respective NOR gates 20.

Pulses occurring at frequency $w_2$ are applied to conductor 8. They toggle only those flip flops 24 through respective NOR gates 22 when all the flip flops in the preceding chain are all ONES. This toggle action will occur unless the particular flip flop is inhibited by the entire counter being in the all-ONES state or by the presence of a zero valued input applied to terminals $2^0$ to $2^n$. Such gating allows the input frequency $w_2$ to drive the counter through a normal binary counting sequence up to the all-ONES state and then to recycle the counter in the highest $A+1$ states, where A is the number encoded at the inputs. One output pulse is emitted synchronously with the input frequency each time the counter recycles through the all-ONES state. As A varies from 0 to $2^n-1$, the ratio of divider output frequency to divider input frequency varies from 1 to $$\frac{1}{2^n}$$

The division scheme utilized in this frequency divider requires that the counter be driven from state to state in its entire sequence of state uniformly at the rate of the input frequency $w_2$. Because the divider accepts digitally encoded inputs, the required sequence of inputs may be generated by a variety of sources, such as a memory unit, a cycling binary counter, an analog-to-digital converter, or even pushbutton switches.

Further details concerning the construction and operation of one form of frequency divider usable with the invention may be found in U.S. patent application 643,134 filed June 2, 1967 by R. B. Sepe entitled, "Digitally Controlled Frequency Divider."

Figure 3:
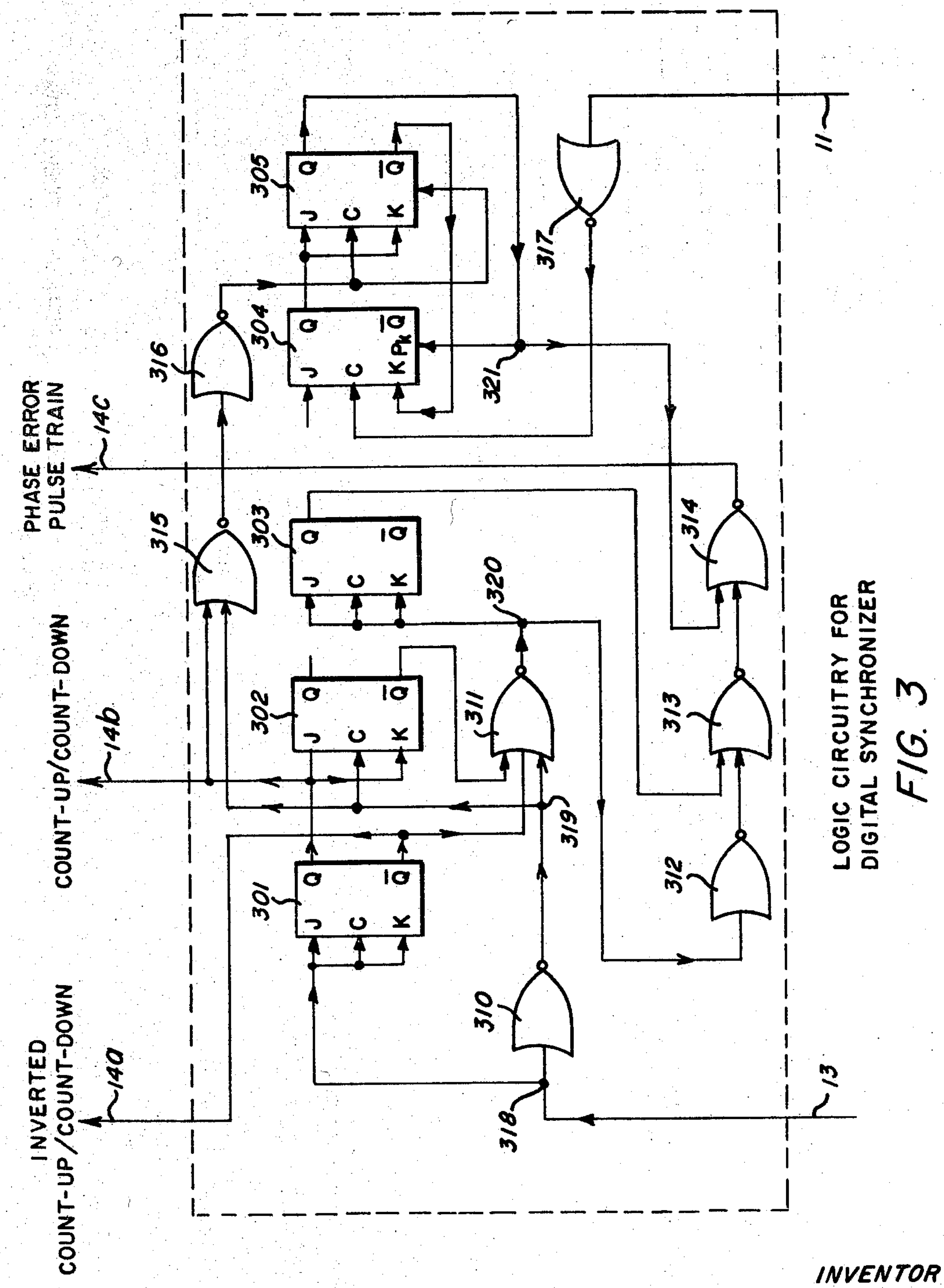
FIG. 3 is the logic circuitry for a digital synchronizer shown in FIG. 1A.

FIG. 3 shows the logic circuitry for the digital synchronizer 3. The purpose of the synchronizer is to serve as a frequency summing by algebraically combining the reference frequency $\omega_1$ and feedback frequency $$\frac{w_2}{A}$$

The synchronizer must generate two outputs to support the phase error tracking operation taking place in bidirectional counter 4. The first output is a pulse train representing phase error increments and appears on conductor **14*c*. The second output is a pulse train representing the algebraic sign associated with the coincidentally occurring phase error increment pulse. This second output appears on conductor 14*b*. The logical complement of the second output appears on conductor 14*a*. The reference frequency input $w_1$ is applied to the synchronizer over path 13**. Similarly, the feedback frequency $$\frac{w_2}{A}$$

is applied over path 11.

Frequency divider 2 produces an asynchronous set of pulses. These are aligned in the digital synchronizer 3 to produce a down count pulse train. The reference frequency is aligned to produce an up count pulse train. Thus, the down count pulse train is produced by pulses gated through NOR gate 317 and flip flops 304 and 305 to appear as one input to NOR gate 314. Similarly, a pulse representing the reference frequency appears as a second input to NOR gate 314. The up count pulse train and down count pulse train are interlaced to form a time division multiplex tracking pulse train. The time division multiplexing requires that positive phase error pulses and negative phase error pulses be located in alternate time slots. The logic represented by flip flops 301, 302, and 303 and the gating arrangements represented by NOR gates 310–313 assure the placement of the positive pulses in alternate time slots whereas the gates 315, 316, and flip flops 304 and 305 assure the alternate placement of the negative phase error pulses. The output pulse train applied on lead **14*b* representing the algebraic sign associated with each of the corresponding pulses in the train generated of 14*c*** functionally is the demultiplexing timing train.

Figure 4:
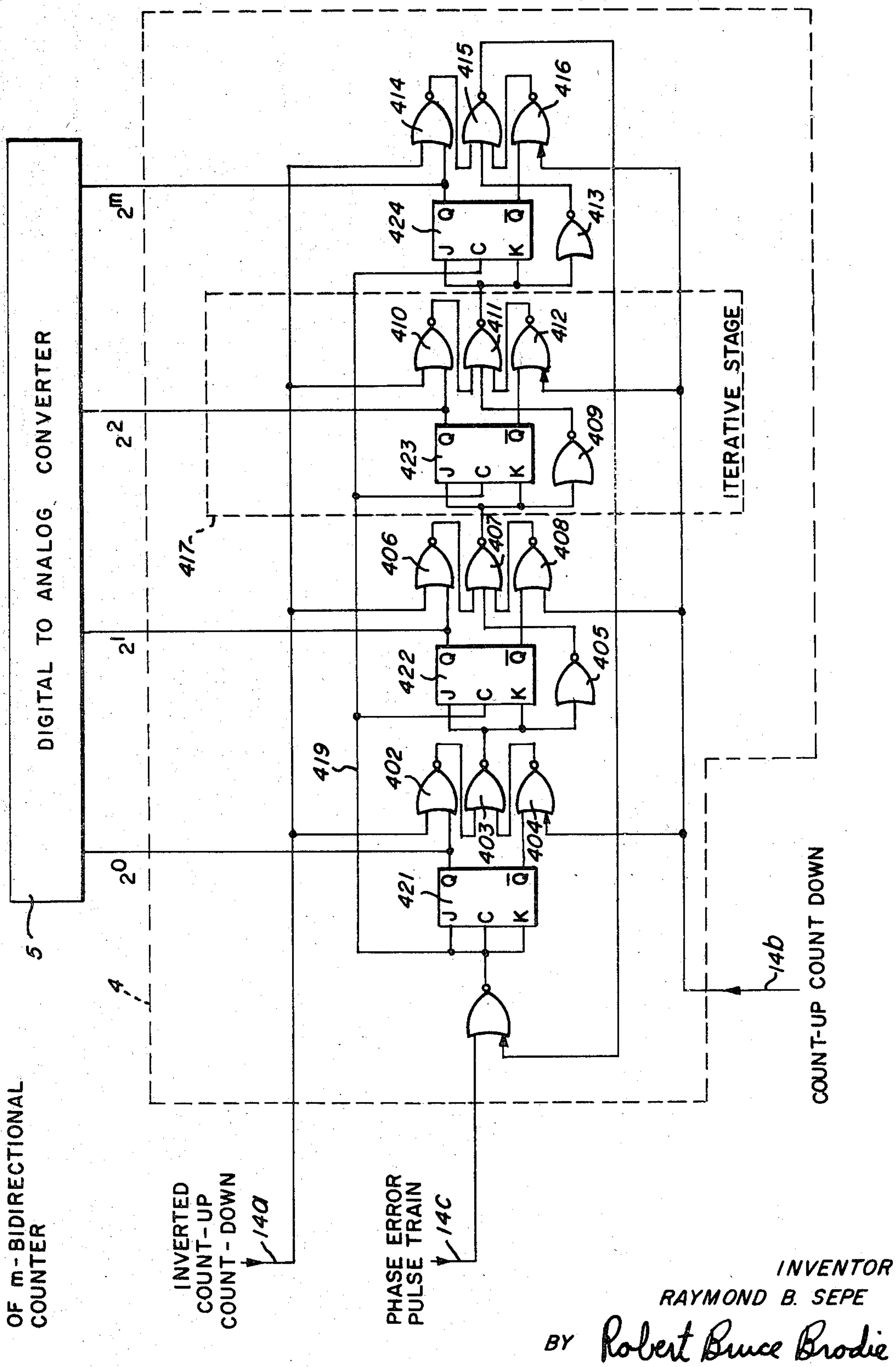
FIG. 4 is a logic circuit diagram of an $m$ bit bi-directional counter shown in FIG. 1A.
Figure 5A:
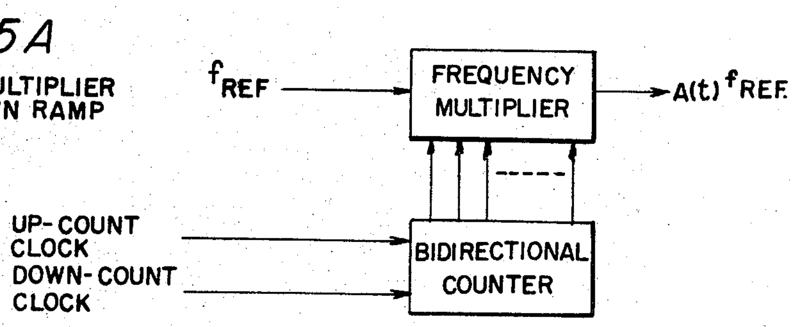
FIG. 5A shows the frequency multiplier with a bidirectional counter as an up/down ramp generator.
Figure 5B:
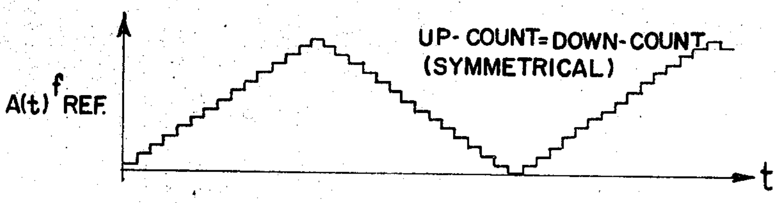
FIGS. 5B and 5C show the relationship between the symmetrical and nonsymmetrical waveforms resulting from the equality or inequality of up and down counts.
Figure 5C:
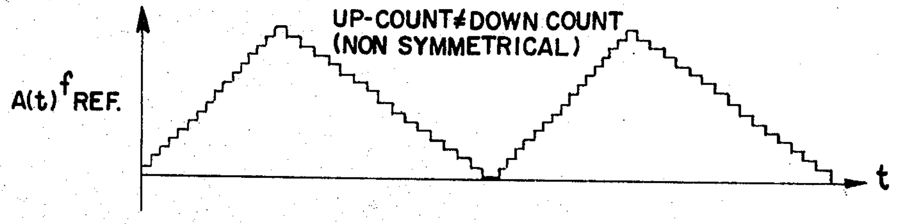
Figure 6A:
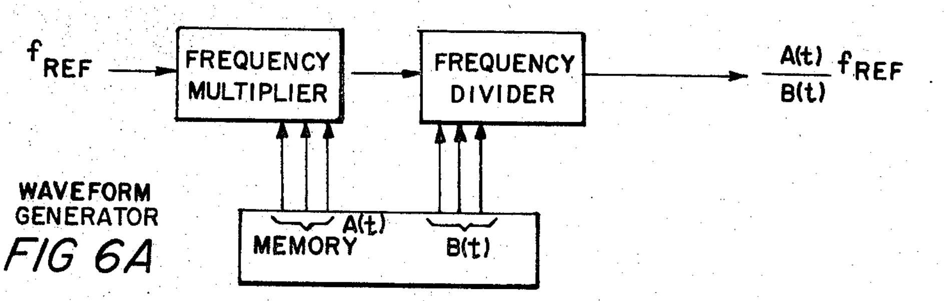
FIG. 6A shows a waveform generator utilizing the frequency multiplier and a frequency divider to form a fractional multiplier.
Figure 6B:
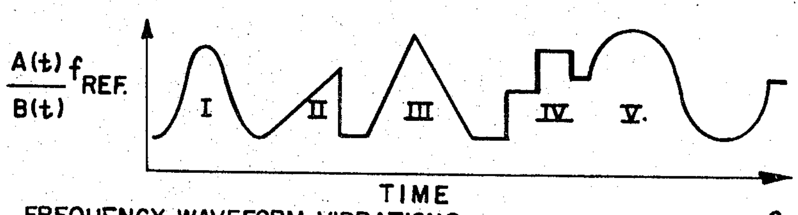
FIG. 6B shows the variety of frequency waveforms which may be achieved utilizing the waveform generator of FIG. 6A.

FIG. 4 shows a logic circuit diagram of the *m* bit bidirectional counter 4. The bidirectional counter accepts the pulse train from the synchronizer on path 14*c* as the basic clocking input. The pulse train applied on path 14*b* is the count up/count down control input. The counter comprises a plurality of flip flops 401–404 with parallel output leads $2^0$, $2^1$ . . . $2^m$ representing the successively increasing orders of binary magnitude coupling the corresponding flip flop outputs respectively of flip flops 401–404. The phase error pulse train applied on path 14*c* and the signal appearing on inhibit lead both appear as inputs to NOR gate 400. The count up/count down input applied on line 14*b* appears as one of two inputs to respective NOR gates 404, 408, 412, and 416. The inverted count up/count down input is applied on conductor 14*a* as one of two inputs to NOR gates 402, 406, 410, and 414. The gating arrangement further includes gates 403 driving flip flop 422, gate 407 driving flip flop 423, gate 411 driving flip flop 424 and gates 415 and 400 driving flip flop 421. An iterative stage, such as 417, comprises a flip flop 403 and the complement of NOR gates 409–412.

In operation, input pulses applied to line 14*c* will sequence the counter (flip flops 421–424, and associated gates) if the count up/count down control has a logic one present on conductor 4*b*. Alternatively, the input pulses applied on line 14*c* will sequence the counter down through its binary states if the count up/count down control input on line 14*b* is a logic zero. The counter is gated such that saturation of the counter in either direction will not cause recycling. This occurs when the counter up counts in excess of its maximum count capacity $2^m$. This results in overflow and subsequent recycling to a minimum count such as zero. Similarly, down counting in excess of the counter's minimum capacity of zero should not result in underflow and subsequent recycling to the maximum count of all-ONES.

The bidirectional counter utilizes a simultaneous carry counting scheme. This is implemented in the following logic recursion formula:

$$T_j = U \prod_{k=j+1}^{m} yk + D \prod_{k=j+1}^{m} \overline{y}k$$

$T_j$ stands for the *j*th bit position and would be defined as the logical state appearing on the Q output of the *j*th flip flop. U refers to the binary logic state of the up count/down count control of ONE. D refers to the logic state of the up count/down count control ZERO. *yk* is the logic state of the Kth flip flop. $\overline{y}k$ is the inverse state of the Kth flip flop. The *m*th bit represents the least significant bit.

As the counter performs an integration of the phase error increments between the reference frequency and the feedback comparison frequency, the counter state is sampled by the digital-to-analog converter 5 thereby generating a DC voltage proportional to the difference frequency.

Digital-to-analog converter 5 may be any one of a many well known digital-to-analog converts designed to accept a digitally encoded signal and converted to analog form. The digitally encoded signal changes in discrete steps, the smallest amplitude change being dependent on the number of signal quantization levels. The conversion of each discrete step on the digital inputs to reflect an accurate change at the analog voltage output requires a settling time. The output will have high frequency transients before it begins to settle. If the output, however, goes into a comparatively low frequency device, then the transients can be ignored.

Filter 6 is designed as a low pass filter intercoupling the analog output of converter 5 to the voltage input of VCO 7. The low pass filter provides smoothing of the transition between states as well as filtering of the high frequency transients. The exact configuration of the low pass filter may be of the well known RC variety.

The one preferred system uses a four bit programmable frequency divider operated from a digital signal generator.

This gives a range of inputs A from 0 to 16. Such a system requires a four bit bidirectional counter as well as a four bit D/A converter. A low pass filter with an upper frequency cutoff of 100 cycles can be used to drive a voltage control oscillator generating an output frequency between 15 kHz. to 28 kHz.

It has been experimentally verified that the product of the number of frequency levels N and the reference frequency $w_1$ will dictate the VCO output frequency range.

In summation, a frequency multiplier has been described in which a closed loop is formed where a reference frequency $w_1$ is multiplied by a magnitude A to form an output frequency $w_2$. This linearity between the multiplier input A and the output frequency $w_2$ is attained through the use of a feedback loop in which is placed a frequency divider. This divider divides the output frequency $w_2$ by A. A comparator algebraically combines the reference frequency $w_1$ and the divided down feedback frequency $$\frac{w_2}{A}$$

to form a control signal which varies an output frequency oscillator. Symbolically, the output frequency $w_2$ is equal to $$k\left(w_1 - \frac{w_2}{A}\right)$$

where k is the lumped transfer constant of the system.

Such a closed loop arrangement can be made digitally responsive through the use of a digitalized frequency divider, a digitalized synchronizer acting as the closed loop comparison element, and a bidirectional counting means. Lastly, the frequency multiplier may be used as a frequency waveform generator when combined with a device that varies the input signal A as a function of time. In this regard, a fractionalized multiplier and waveform generator is achieved by placing the multiplier in series with a frequency divider. In this relation each element is responsive to an independent time varying signal.

What is claimed is:

1. A frequency multiplier comprising:
a source of signals of frequency $w_1$;
a source of signals of frequency $w_2$;
means responsive to a magnitude signal A and frequency signal $w_2$ for frequency dividing $w_2$ by A; and
means responsive to frequencies $w_1$ and $$\frac{w_2}{A}$$

for varying $w_2$ such that $w_2$ is equal to $$k\left(w_1 - \frac{w_2}{A}\right)$$

$k$ being a proportionality constant and $|k| \gg 1$.

2. A frequency multiplier comprising:
a source of signals of frequency $w_1$;
an analog magnitude responsive oscillator of frequency $w_2$;
means responsive to a magnitude signal A and frequency signal $w_2$ from frequency dividing $w_2$ by A;
means for algebraically combining the $w_1$ and the $$\frac{w_2}{A}$$

and
means for applying an analog magnitude to the oscillator proportional to the algebraically combined frequency.

3. A frequency multiplier comprising:
a source of pulses of frequency $w_1$;
an oscillator having a pulse repetition frequency of $w_2$;
means responsive to a magnitude signal A and frequency $w_2$ for frequency dividing $w_2$ by A;
a bidirectional counting means;
means for causing the counting means to count in a first direction at a rate proportional to $w_1$ and for counting in a second direction at a rate proportional to $$\frac{w_2}{A}$$

and means coupling the oscillator and responsive to the counter magnitude for proportionally varying $w_2$.

4. A frequency multiplier according to claim 3, characterized in that the bidirectional counting means comprise:

an $m$ bit counter having a first direction counting capacity of $2^m$ and a second direction counting capacity of zero; and means for inhibiting count overflow, underflow, and recycling.

5. A frequency multiplier according to claim 3, characterized in that the means for frequency dividing $w_2$ by A comprise:

a plurality of $n$ cascaded switchable storage elements;

means for deriving a divider control signal from a signal of magnitude A into an $n$ bit binary coded signal equivalent;

clock gating logic means for gating the control signal into the $n$ storage means; and toggle logic means responsive to the frequency $w_2$ for altering the state of the storage means such that the output frequency represents the input frequency $w_2$ divided by any integer from binary 1 to $2^n$.

6. A frequency multiplier comprising:

a source of pulses of frequency $w_1$;

an oscillator having a pulse repetition frequency of $w_2$;

means responsive to a magnitude signal A and frequency $w_2$ for frequency dividing $w_2$ by A;

bidirectional counting means including:

an $m$ bit counter having a first direction counting capacity of $2^m$ and a second direction count capacity of zero; and means inhibiting count overflow, underflow, and recycling;

means for causing the counting means to count in a first direction at a rate proportional to $w_1$ and for counting in a second direction at a rate proportional to $$\frac{w_2}{A}$$

and means coupling the oscillator and responsive to the counter magnitude for proportionally varying $w_2$.

7. A frequency waveform generator comprising:

bidirectional counting means;

means for varying the count magnitude $A(t)$ as a function of time;

a source of signals of reference frequency $w_1$; and a frequency multiplier responsive to the counter contents $A(t)$ and the reference frequency $w_1$ for generating an output signal of frequency $w_2$ such that $w_2$ is proportional to the product of $A(t)w_1$.

8. A frequency waveform generator according to claim 7, characterized in that the means for varying the counter content cause a symmetrical increaing and decreasing frequency versus time ramp function when the successive increasing count increments equal the successive decreasing count increments.

9. A frequency waveform generator according to claim 7, characterized in that the means for varying the counter content cause an asymmertcial output frequency versus time ramp function when the number of successive counter counts in the first direction is not equal to the number of successive counter counts in the second direction.

10. A frequency waveform generator comprising:

a source of signals of reference frequency $w_1$;

means for generating a time varying signal magnitude $A(t)$;

means for generating a time varying signal magnitude $B(t)$;

a frequency multiplier for generating an output frequency signal $w_2$ such that $w_2$ is proportional to the product of $A(t)w_1$; and a frequency divider coupling the multiplier and responsive to $B(t)$ for producing a frequency divided signal $$\frac{A(t)w_1}{B(t)}$$

References Cited

UNITED STATES PATENTS

| | | | |
|---|---|---|---|
| 2,519,223 | 8/1950 | Cheek | 328—160X |
| 2,813,977 | 11/1957 | Carter | 331—53X |
| 3,204,185 | 8/1965 | Robinson | 328—161X |
| 3,223,928 | 12/1965 | Fayman | 331—53X |
| 3,249,943 | 5/1960 | Kaufman | 331—38X |

JOHN S. HEYMAN, Primary Examiner

U.S. Cl. X.R.

328—16, 25, 44; 331—38, 53